United States Patent
Nguyen Dinh Hien et al.

(10) Patent No.: US 11,907,773 B2
(45) Date of Patent: Feb. 20, 2024

(54) METHOD FOR COMMUNICATING BETWEEN SOFTWARE ENTITIES VIA AN API

(71) Applicant: SAGEMCOM BROADBAND SAS, Rueil Malmaison (FR)

(72) Inventors: Michaël Thien Bao Nguyen Dinh Hien, Rueil Malmaison (FR); Jean-Philippe Jaulin, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 17/641,701

(22) PCT Filed: Sep. 11, 2020

(86) PCT No.: PCT/EP2020/075532
§ 371 (c)(1),
(2) Date: Mar. 9, 2022

(87) PCT Pub. No.: WO2021/048395
PCT Pub. Date: Mar. 18, 2021

(65) Prior Publication Data
US 2022/0413949 A1   Dec. 29, 2022

(30) Foreign Application Priority Data
Sep. 12, 2019  (FR) ........................ 1910071

(51) Int. Cl.
*G06F 9/54*   (2006.01)
*G06F 8/71*   (2018.01)

(52) U.S. Cl.
CPC ............... *G06F 9/546* (2013.01); *G06F 8/71* (2013.01); *G06F 9/541* (2013.01)

(58) Field of Classification Search
None
See application file for complete search history.

(56) References Cited

U.S. PATENT DOCUMENTS 9,516,130 B1   12/2016   Graham-Cumming
2001/0030976 A1* 10/2001   Turner ................... H04L 69/22
                                          370/466
(Continued)

FOREIGN PATENT DOCUMENTS

| CA | WO 2007087727 A1 * | 2/2007 | ......... G06F 9/44521 |
| EP | 1845446 A2 | 10/2007 | |

OTHER PUBLICATIONS

Emeakaroha, Vincent C. et al., "Towards Automated Cost-Efficient Data Management for Federated Cloud Services", 2016 5th IEEE International Conference on Cloud Computing, Oct. 3, 2016, pp. 158-163.

*Primary Examiner* — Charles E Anya
(74) *Attorney, Agent, or Firm* — Muncy, Geissler, Olds & Lowe, P.C.

(57) ABSTRACT

Method for communicating via an API, including the steps of:
 producing a structural description of each version of the transaction;
 producing a signature which is representative of the structural description of the version;
 defining and saving an object comprising the signature and the structural description of the version;
 causing a transmitting software entity to transmit a current message of a current version of the transaction and a current signature of the current version;
 causing a receiving software entity to receive the current message and the current signature;
(Continued)

causing the receiving software entity to identify an object having a signature identical to the current signature, and decoding the current message using the structural description of the object.

14 Claims, 5 Drawing Sheets

(56) References Cited

U.S. PATENT DOCUMENTS

| | | | |
|---|---|---|---|
| 2005/0203673 A1* | 9/2005 | El-Hajj | G06Q 10/08 |
| | | | 701/1 |
| 2005/0226240 A1* | 10/2005 | Hoffmann | G06Q 10/107 |
| | | | 370/389 |
| 2008/0071887 A1* | 3/2008 | Gaurav | G06F 16/88 |
| | | | 709/220 |
| 2009/0276481 A1* | 11/2009 | Anna | H04L 67/565 |
| | | | 709/201 |
| 2010/0185869 A1* | 7/2010 | Moore | H04L 9/3247 |
| | | | 713/179 |

* cited by examiner

Fig. 1
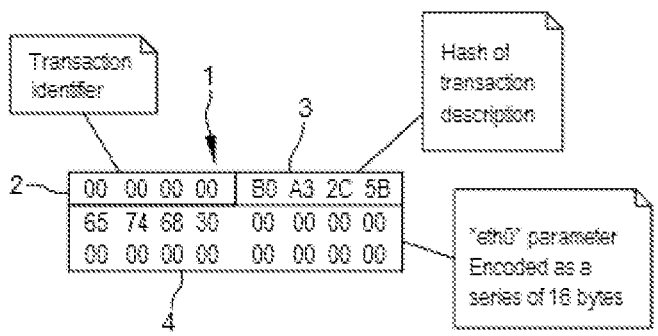
Fig. 2
Fig. 3
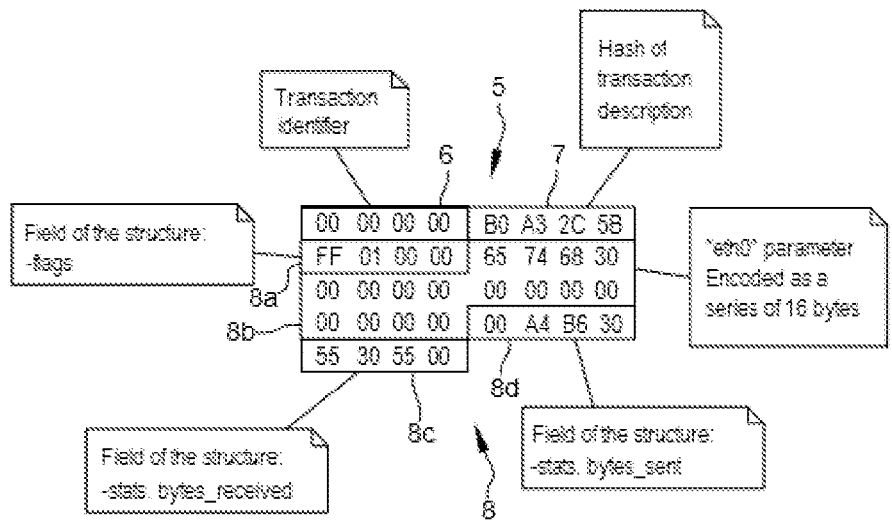

METHOD FOR COMMUNICATING BETWEEN SOFTWARE ENTITIES VIA AN API

The invention relates to the field of application programming interfaces (API).

BACKGROUND OF THE INVENTION

Two software entities, regardless of whether or not they are located in the same "physical" piece of equipment, can exchange information over a common medium via an application programming interface (API). The API comprises a set of transactions, each of which performs exchanges of messages.

Each message that is exchanged is structured in a way that is adapted to transporting the information associated with the message (description of fields, types of fields, etc.).

As new versions of the transactions in various different software entities continue to be developed, the structure of these messages can change as a function of new needs. These changes rarely take place synchronously at opposite ends of a link.

A software entity that receives a message decodes said message using the structure description as defined in its own version of the API transaction.

The type of data structure that is considered herein is a set of fields, each of which may possess a respective value. It is the value contained in a given field that needs specific processing after the API has been used.

Each field is initially typed. This means that each field accepts values of a certain type, e.g. an integer, a string of characters, or some other structure. It can be considered that a typed table is a succession of fields of the given type.

Furthermore, since a type can be used several times over, the structure is an ordered set of fields.

It is also considered that the encoding and the decoding of data structures are based solely on their respective types, which is described between parentheses. This consideration limits the number of types that are possible and takes away the semantics from each field. This consideration needs to be taken into account in so far as the number of different possible fields is not limited.

Thus, when a message received by a software entity has been encoded in a version of the transaction that is not implemented in that entity, there results a communication error that might lead to a message not being decodable or to a message being interpreted erroneously.

Naturally, this problem arises mainly when the two software entities belong to two distinct pieces of equipment that might have been subjected to different changes.

For example, when a first piece of equipment asks a second piece of equipment to specify its characteristics, the message used may be:

ID_request; and the reply may be:

ID_answer.

In this example, it is considered that the message ID_request requires in return a single value corresponding to ID.

In this example, it is assumed that the second piece of equipment, using its own version of the software, encodes its answer in a structure made up of fields that are typed as follows:

(integer) ID
(character string) Name
(integer) Maxbandwidth
(integer) Latency

In its version of the software, the first piece of equipment expects a structure of the following type:

(integer) ID
(character string) Name
(integer) Latency

Thus, the first piece of equipment sends data to the second piece of equipment, which data contains the value corresponding to ID. In order to respond, the second piece of equipment constructs its answer using its own structure, which therefore comprises ID, Name, Maxbandwidth and Latency. The second piece of equipment then sends its answer.

On receiving the answer, the first piece of equipment decodes the data. The values associated with the fields ID and Name match and make sense. In contrast, the value decoded from the Latency field is in fact given to the Maxbandwidth field in the structure known to the second piece of equipment. Consequently, the message is understood erroneously and can thus lead to the information being processed wrongly.

Several approaches have been envisaged for guaranteeing compatibility between the transaction versions used by the two software entities.

It is possible to characterize each version of the transaction by a version number that is verified on reception of the message by the other software entity. Nevertheless, that solution can lead to incompatibilities associated with developments being made in non-uniform manner.

It is also possible to sign and certify the versions used. Nevertheless, two versions that are deemed to be incompatible cannot communicate, even though some of their messages are compatible.

It has also been envisaged to transmit the description of the structure of each message prior to transmitting the message itself, in order to ensure compatibility between versions. That approach is very burdensome because of the number of messages is large compared with their real use.

Document U.S. Pat. No. 9,516,130 B1 describes a method of communication between two versions of a transaction of an API via an additional cache software module that serves to reorder the parameters in order to make them compatible between the software entities. That method requires the additional cache software module to be developed and used, thereby making the method complicated and expensive to implement.

In Linux there is a communication bus known as uBus that enables services to propose objects that are structured and strictly defined. The data may be requested or modified by means of a request, which is a structured message for sending. In order to know how to structure the message in order to make the request, the structure can be requested from the communication bus. Depending on the answer to that request, it is possible to use the description to adapt processing.

That mechanism permits compatibility between actors, but it requires the use of an adaptive "data structure translator". Furthermore, it requires the description to be loaded and analyzed before beginning to exchange useful data.

OBJECT OF THE INVENTION

An object of the invention is to provide message exchange compatibility between two software entities communicating via an API, and to do so in a manner that is simple, inexpensive, and effective.

SUMMARY OF THE INVENTION

In order to achieve this object, there is provided a communication method for communication between two software entities via an application programming interface (API) that comprises at least one transaction, the communication method including a configuration stage comprising the following steps that are performed in each software entity and for each version of the transaction that is implemented by said software entity:

producing a structure description of the version, which description includes an global structure for each message that can be exchanged in that version of the transaction;

producing a signature that is representative of the structure description of the version of the transaction;

defining and saving an object comprising the signature and the structure description of the version;

the communication method further comprising a sending stage including the step of:

causing a sender software entity to send a current message in a current version of the transaction, together with a current signature of the current version; and a reception stage comprising the steps of:

causing a receiver software entity to receive the current message and the current signature;

causing the receiver software entity to identify an object having a signature identical to the current signature, and to decode the current message by using the structure description of said object.

Thus, on reception of the current message, the receiver software entity verifies whether it does indeed implement the version of the transaction that was used by the sender software entity, and it uses the structure description of the correct version in order to decode the current message.

The communication method of the invention thus makes it possible to ensure that transmitted messages are interpreted correctly. The communication method of the invention is simple to perform, inexpensive, consumes little bandwidth, and does not present the limitations of prior art solutions.

There is also provided a communications method as described above, wherein, during the configuration stage, the signature is obtained by performing a hashing function on the structure description of the version, which hashing function is identical for all of the versions of the transaction.

There is also provided a communications method as described above, wherein the current signature is transmitted to the receiver software entity by being included in the current message.

There is also provided a communications method as described above, wherein, during the configuration stage, each software entity stores the objects in a versions table.

There is also provided a communications method as described above, wherein, during the configuration stage, the sender software entity and the receiver software entity exchange their respective versions tables so that the sender software entity knows the versions of the transaction that are implemented by the receiver software entity, and uses those versions.

There is also provided a communications method as described above, wherein the versions table of the sender software entity includes, in association with a first receiver software entity, at least one priority identifier that identifies a priority version of the transaction, the sender software entity using the priority version as a priority when communicating with the first receiver software entity.

There is also provided a communications method as described above, wherein the versions table of the sender software entity includes at least one default identifier that identifies a default version of the transaction for use by the sender software entity as a priority when the sender software entity is communicating with a second receiver software entity that is not associated with a priority version in the versions table of the sender software entity.

There is also provided a communications method as described above, wherein each object comprises, in addition to the signature and the structure description of the version associated with said object, a preference indicator serving to evaluate a plurality of versions and to compare them with one another in order to select an optimum version for optimizing the performance of the communication.

There is also provided a communications method as described above, wherein the configuration stage includes a step during which the hashing function is negotiated between the software entities.

There is also provided a communications method as described above, wherein the configuration stage includes the step of defining a finite set of basic types for defining the global structures of messages and of associating a type identifier with each basic type, whereby the structure representation of each version comprises a string of said type identifiers.

There is also provided a communications method as described above, wherein each type identifier is a distinct character.

There is also provided a communications method as described above, wherein the global structure of at least one message may also comprise at least one nested data structure.

There is also provided a communications method as described above, wherein the finite set of basic types includes at least one basic type for delimiting the nested data structure.

There is also provided equipment including a software entity arranged to communicate via an application programming interface (API) that comprises at least one transaction, the software entity including a versions table produced by performing the steps of the configuration stage of the communication method as described above, the software entity also being arranged to perform the sending stage and/or the reception stage of the communications method as described above.

There is also provided a computer program including instructions for causing the above equipment to execute the configuration stage and also the sending stage and/or the reception stage of the above-described communication method.

There is also provided a computer-readable storage medium, having stored thereon the above-described computer program.

The invention can be better understood in the light of the following description of a particular, nonlimiting implementation of the invention.

BRIEF DESCRIPTION OF THE DRAWINGS

Reference is made to the following accompanying drawing:

FIG. 1 shows a table associating basic types with characters;

FIG. 2 shows a message for initiating a transaction;

FIG. 3 shows an answer message of the transaction;

DETAILED DESCRIPTION OF THE INVENTION

Figure 4:
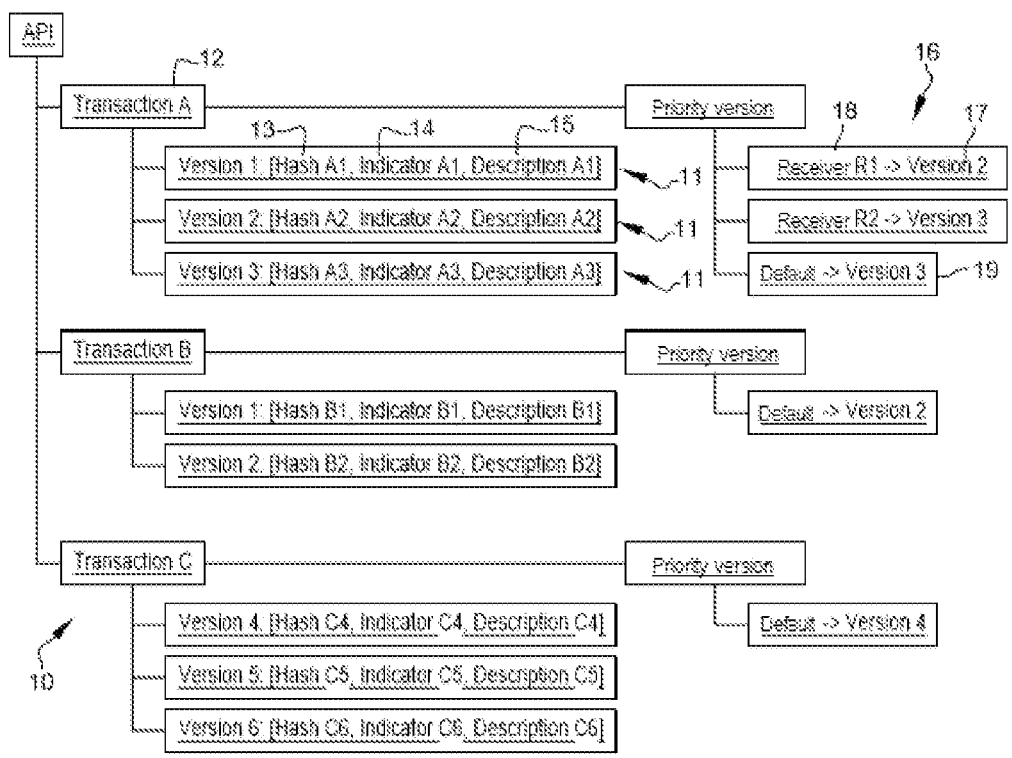
FIG. 4 shows a versions table of a software entity.

The communication method of the invention enables software entities to communicate with one another over a common medium via an API. Each software entity may possibly, but not necessarily, be incorporated in a distinct piece of equipment.

The form of the API is defined as follows. The API includes a plurality of transactions, each defined by a set of messages. Among the messages, a distinction is drawn between "initiator messages", or "requests", and other messages that may optionally be associated therewith, and that are referred to as "answer messages". Message order and type are important, and define the transaction.

Each message is itself constituted by data. The data is structured, i.e. it forms a set made up of fields.

Using the common medium requires the data structure to be transformed for sending, which is referred to as "encoding", and the inverse transformation is referred to as "decoding". Each field of the data structure is typed in order to enable it to be encoded and decoded during transmission of the message from one software entity to another by means of the common medium.

The type of a field is an element taken from a set of elements and it serves to define the way in which encoding and decoding are performed. A common medium (a network "socket" or a "pipe") generally takes account only of a sequence of eight-bit bytes ("buffer"). One way of encoding information is to define a simple data structure, such as "type, length, value" (TLV). Encoding then consists in allocating a value on a predefined number of bytes (e.g. 1) for the type, in providing the length of the information on a predefined number of bytes (e.g. 1), and in placing the value as a succession of bytes. Encoding follows the order of the data structure that is to be sent. Decoding is based on the predefined points so as to scan through the sequence of bytes and assign each value that is discovered to a field of the structure. The type and the length specify how the value portion is to be extracted.

When the data structure is at transmission level, the semantics of the information are not conserved, but the semantics must be known to both software entities.

Each software entity may potentially implement a plurality of versions of each transaction. These versions can differ between the software entities, which can lead to messages being interpreted erroneously.

The communication method of the invention begins with a configuration stage, that is performed in each software entity when the API is instantiated, and that is performed for each version of each transaction that is implemented by said software entity. It should be observed that it is possible to re-instantiate an API to manage new versions of the API: the configuration stage is then performed again.

The configuration stage consists initially in producing a description of the structure of each version of the transaction implemented by the software entity. This structure description comprises a description of the global structure of each message that can be exchanged in its version of the transaction.

In order to define the global structure of a message, a finite set of basic types is defined initially.

The finite set of basic types serves to describe fundamentally the ways in which units of data are represented.

By way of example, this implies that a signed integer on 32 bits is a description that is shared by all of the pieces of equipment, and thus that the name of the basic type is explicit for basic understanding of the information.

A basic type may represent a more particular object, for example a MAC address. It is possible to represent a MAC address with a succession of 6 unsigned integers on 8 bits, but this series of unsigned 8-bit integers must have order and coherence in order to define a MAC address.

It is thus possible to add such a basic type in the finite set of basic types used for describing the global structure.

The description of the global structure of a message is thus a sequence of elements from the finite set of basic types.

A respective type identifier is associated with each basic type of the finite set of basic types. In this example, each type identifier is a distinct character.

It is necessary for this correspondence to be the same for all of the software entities (and for all of the pieces of equipment) using the API, since it serves as the reference for coherent description of the global structure of messages.

Furthermore, this correspondence must be bijective, in so far as one enables the same sequences of decisions to be taken as the other.

For example, and as can be seen in the table of FIG. 1, a signed integer on 16 bits, i.e. 2 bytes (int16_t), is represented by the character 'b'. A signed integer on 32 bits is represented by the character 'c'. An unsigned integer on 64 bits, i.e. 8 bytes (uint64_t), is represented by the character 'h'. An IPv4 address is represented by the character 'i'.

The basic types referred to as "initiator message" or as "answer message" serve to specify that the following message has the purpose of being sent when initiating a transaction, or of being used as an answer during the transaction.

The global structure of each message comprises a data structure.

The basic types referred to as "start of structure" and as "end of structure" serve to characterize the composition of a data structure. These basic types are used to define nested data structures.

For example, the data structure str1 below, encoded using the C language, contains 3 unsigned integers, the first two being on 8 bits and the last one being on 32 bits.

```
struct str1 {
   int8_t val1;
   int8_t val2;
   int32_t val3;
};
```

Using the table of FIG. 1, this data structure str1 is represented by the following string of characters:

str1_proto→"("""a" "a" "c"")"

The global structure of each message may also comprise a nested data structure.

The data structure str2 below is a nested data structure:

```
struct str2 {
    int8 val1;
    struct str1 val2;
    int16 val3;
};
```

This nested data structure str2 contains a first signed integer on 8 bits, the above-described data structure str1, and a second signed integer on 16 bits.

Thus:
str1_proto→"("" "a" "a" "c"")"
str2_proto→"("" "a" str1_proto "b"")"

The nested data structure str2 is thus represented by the following final character string:
str2_proto→"("" "a" "("" "a" "a" "c"")" "b"")"

Naturally, a nested data structure should not be confused with a data structure that possesses the same sequence of fields.

It is also possible to add description characters that indicate which particular message of the API transaction is represented.

Consideration is thus given to adding a basic type (and thus an associated character) that covers a data structure for sending a request, and another basic type (and thus another character) that covers an answer data structure.

A transaction that is more complex, i.e. with more steps, can also be introduced and described in this way.

Once the set of basic types (including structure delimiters and possibly other markers of the API) has been defined, a character string is concatenated that comprises, for each message of the version of the transaction, an ordered sequence of characters describing the global structure of the message.

This string of characters forms the structure description of the version of the transaction, and it then describes completely the version of the transaction of the API and the way in which an exchange of messages is to be encoded and decoded. The string of characters is of variable size: its size is large if the structure of the transaction is itself large.

There follows a description of an example of the structure description for a version of a transaction in XML format.

This transaction is named getInterface.

The transaction uses an initiator message that is called by the transaction_send_getInterface method, the message comprising a "string" type parameter and a string of characters having a maximum size of 16 bytes.

The transaction is completed by a transaction_answer_getInterface answer message made up of a nested data structure named interface. This structure is made up of 3 fields: flags, name, and stats. The flag field type is an unsigned integer on 32 bits. The name field is of "string" type having a size of 16 bytes. The stats field is a structure of "stats" type. This structure is made up of two fields bytes_sent and bytes_received. These two fields are of unsigned integer type on 32 bits.

Use is thus made of the following stats data structure and of the following interface nested data structure:

```
Struct stats {
    uint32_t bytes_sent;
    uint32_t bytes_received;
};
```

```
struct interface {
    uint32_t flags;
    string name [16]
    struct stats stats;
};
```

And the following messages are defined:
transaction_send_getInterface (string name[16])
transaction_answer_getInterface (struct interface)

The string of characters used to form the structure description of the version of the transaction is thus:
STATS_STRUCT→"("" "g" "g"")"
INTERFACE_STRUCT→"("" "g" "s" "{16}" STATS_STRUCT")"
GETINTERFACE_CMD→">" "s" "{16}" "<" INTERFACE_STRUCT A signature is then produced that is representative of the structure description of the version of the transaction. To do this, use is made in this example of a hashing function on the structure description of the version of the transaction. The hashing function used is the same for all of the versions of all of the transactions, and for all of the software entities that communicate via the API.

A signature of the structure description of each version is thus obtained, corresponding to as many structures and thus to as many encoding and decoding methods as there are versions.

The hashing function serves to reduce the quantity of information that needs to be sent in order to identify the structure description of the version of the transaction.

Any hashing function may be used. The hashing function is shared or negotiated between the software entities that communicate via the API in order to be able to identify the same thing.

By way of example, it is possible to use the MD5 or SHA512 methods for performing hashing. For a signature (or "hash") of smaller size, it is also possible, by way of example, to use the FNV-1a method that enables a signature to be constructed on 32 bits from a sequence of bytes or a string of characters.

Depending on the hashing functions used, the following values are obtained for the above-described transaction (hexadecimal numbers):
FNV-1a: 5b2ca3b0
MD5: 406280ce3c01afe232e99cb6f3bdf746
SHA512:
7a63f225590
dcd1cf95cbca934a035c719a2bdfe3bed2d7e0dada360
39c4804ede4ef22f95571a699cce1065aae362a9127b16d1-
ea866dc26 a4c5e62a3011705

The construction of a message that can be transmitted over a medium is a series of bytes.

Ignoring headers that might possibly be used for communicating over the medium, the initiator message itself may be encoded as follows:
GET_INTERFACE 5b2ca3b0 "eth0"

In FIG. 2, there can be seen an initiator message 1. The initiator message 1 is shown in the form of a sequence of hexadecimal numbers corresponding to a sequence of bytes after encoding has been performed for transmission over the medium.

The initiator message 1, called via the transaction_send_getInterface method, comprises in succession: an identifier 2 for the transaction, the signature 3 of the version of the transaction, and information for transmission 4, which is the parameter "eth0".

The identifier of the transaction is encoded by an integer on 32 bits, and in this example it is equal to zero.

The signature 3 of the version of the transaction is encoded for transmission over an Internet protocol (IP) type network (most significant byte first).

The parameter corresponding to the information for transmission 4 follows the identifier and the signature 3. The parameter is a string of single characters, each character being added simply in its byte representation. The parameter, which was described as being of size 16, is completed by a series of zeros.

Likewise, with reference to FIG. 3, the answer message 5 comprises in succession: the identifier 6 of the transaction, i.e. zero, the signature 7, and information for transmission 8.

The information for transmission 8 comprises the entire nested data structure, i.e. the flags field 8a, "eth0" parameter 8b, the "bytes_sent" field 8c of the stats substructure and the "bytes_received" field 8d of the stats structure.

The "stats" substructure, made up of two unsigned integers on 32 bits, is thus juxtaposed in order to terminate the content of the message.

For each version of a transaction of the API, each software entity then produces an object that represents the version and that comprises an identifier of the transaction, the previously-calculated signature, together with the structure description of the version that contains the encoding and decoding methods of the associated messages and that thus enables information to be transmitted over a common medium.

The software entity then saves all of the objects in a table of versions.

Advantageously, a preference indicator is added to each object so as to enable a plurality of versions to be evaluated and compared in order to select an optimum version for optimizing the performance of the communication.

The preference indicator makes it possible to give more details about the logic for selecting the version of the transaction that is to be used depending on usage circumstances.

By way of example, the preference indicator may give a greater or smaller number of parameters that can be transmitted, or indeed the date on which the version was put in place.

In the event of there being multiple compatible versions at both ends, this additional preference indicator serves to select the version of the transaction that is best adapted to the message for transmission.

By way of example, the preference indicator makes it possible to select the version that occupies the least space on the medium.

The above description is illustrated with the example of FIG. 4.

The tree structure of FIG. 4 is a versions table 10 of a sender software entity. It can be seen that the API comprises a first transaction A, a second transaction B, and a third transaction C.

The sender software entity in question implements a version 1, a version 2, and a version 3 of the transaction A, a version of 1 and a version of 2 of the transaction B, and a version 4, a version 5, and a version 6 of the transaction C.

It can be seen that the number of versions implemented for a given transaction need not necessarily be the same for each transaction. For example, the transaction B contains only two versions: version 1 and version 2.

Each object 11 associated with a version of a transaction comprises the identifier 12 of the transaction, the signature (or "hash") 13 of the version, and the structure description 14 of the version enabling the messages to be encoded and decoded.

Each object also comprises a preference indicator 15.

Each transaction is also associated with a priority versions table 16.

For transaction A, the priority versions table 16 includes two priority identifiers. Each priority identifier that identifies a priority version 17 of the transaction A in association with a first receiver software entity 18, i.e. a version that the sender software entity uses as a priority when the sender software entity is communicating with said first receiver software entity.

In this example, for transaction A, the receiver software entity R1 and the receiver software entity R2 are "first" receiver software entities. Version 2 is the priority version for the receiver software entity R1, and version 3 is the priority version for receiver software entity R2.

For each transaction, the priority versions table 16 also includes a default identifier that identifies a default version 19 of the transaction, for use by the sender software entity as a priority when the sender software entity is communicating with a second receiver software entity that is not associated with a priority version in the versions table 10 of the sender software entity.

Thus, the transaction A, the version by default 19 is the version 3 for all of the receiver software entities other than the receiver software entities R1 and R2 (which other receiver software entities are referred to as "second" receiver software entities).

For the transaction B, there is no priority version that depends on a receiver software entity, and the version by default is version 2 (for all of the receiver software entities, which are therefore all "second" receiver software entities). For the transaction C, there is no priority version that depends on a receiver software entity, and the version by default is version 4 (for all of the receiver software entities, which are therefore all "second" receiver software entities).

This association between a receiver software entity and a priority version may be determined after a transmission has been successful, in which event it is possible to confirm which version is to be used, or else it may be determined as a result of a prior exchange of the API versions tables with the various receiver software entities.

It can thus be seen that the priority version of a transaction need not necessarily be the most recent version in the versions list of that transaction.

It can also be seen that the transaction C contains versions 4, 5, and 6. By way of example, this may show that versions 1 to 3 can be considered as being obsolete.

In this way, it is possible to update an API in iterative manner, and also to deprecate some of its versions by adding or removing entries in the table.

There follows a description of the stages of transmitting and the stages of receiving messages, which stages take place after the configuration stage.

The sender software entity sends a current message of a current version of a transaction.

The current message for transmitting over the medium may thus be built up as described above by putting the following elements strictly into succession:

identifier of the current message (identifier of the transaction);

signature of the structure representation of the version of the transaction corresponding to the entry in the table;

encoded information for transmission in the current message i.e. current message content encoded by the structure description.

The receiver software entity receives the current message by recovering the elements in their order of arrival so as to extract:
- identifier of the current message (identifier of the transaction);
- signature of the structure representation;
- encoded information for transmission In its versions table, the receiver software entity identifies the transaction and also an object having a signature that is identical to the current signature.

If a match is found, the destination receiver software entity can proceed to decode the current message using the structure description of the object in question, and can then feed the information back to the application for processing.

The application portion of the program may be specific to one version of the message for processing.

In contrast, if no match is found, the message cannot be processed.

At this point, it should naturally be observed that a software entity need not necessarily be either a sender entity only or else a receiver entity only, but could be both a sender entity and a receiver entity: a transaction can take place in both directions.

Thus, for a given software entity, the same versions table may be created and used for making the selections for sending and for processing on reception.

Figure 5:
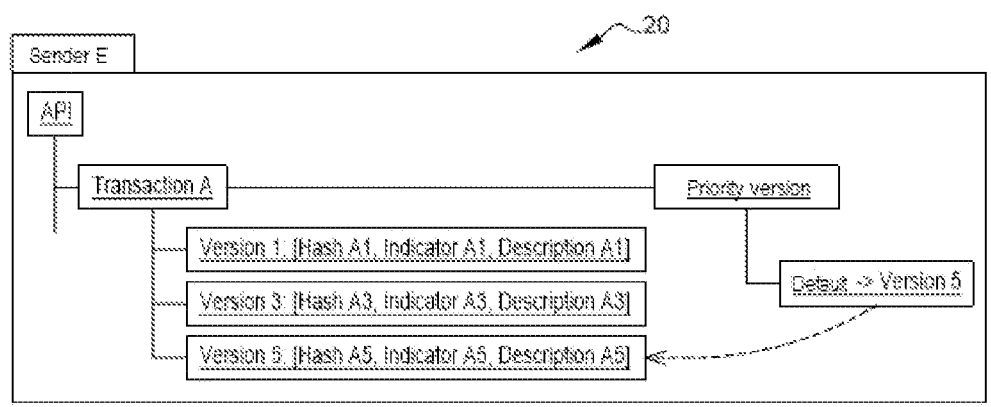
FIG. 5 shows a versions table of a sender software entity communicating with a receiver software entity.
Figure 6:
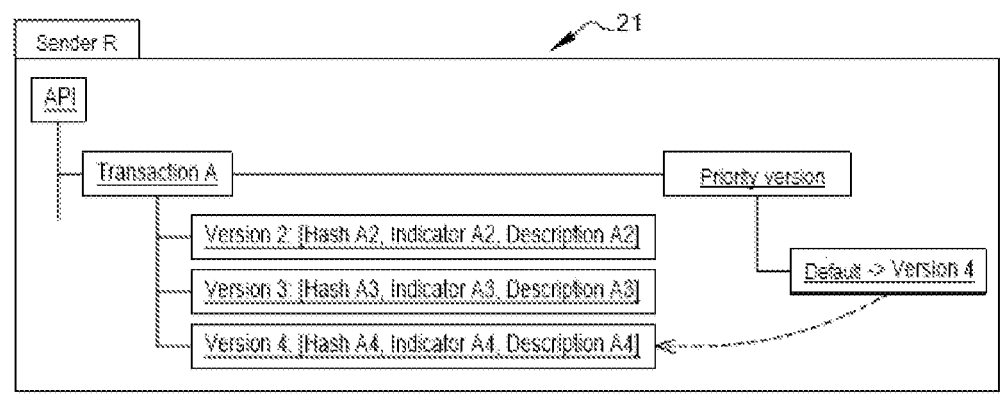
FIG. 6 shows a versions table of the receiver software entity.
Figure 7:
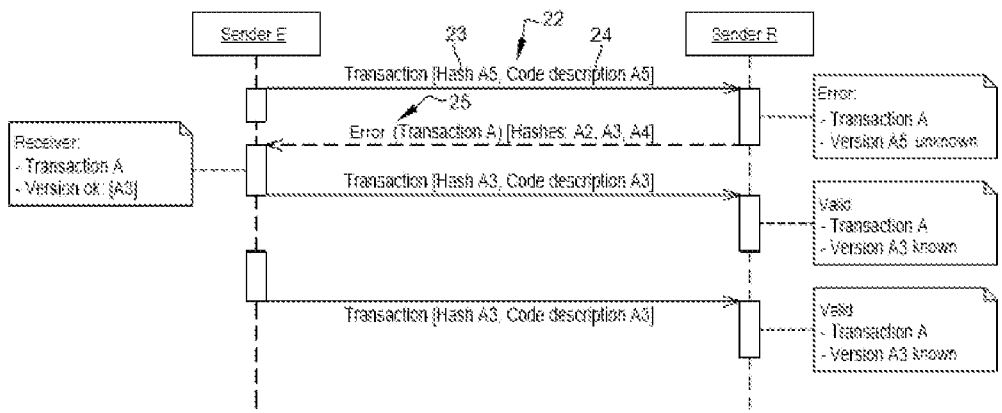
FIG. 7 shows the dialogue between the sender software entity and the receiver software entity.

With reference to FIGS. 5, 6, and 7 there follows a description of an example of the communication method of the invention being performed by means of a sender software entity and a receiver software entity that share the implementation of an API containing the transaction A.

The versions table 20 of the sender software entity E can be seen in FIG. 5. The versions table 21 of the receiver software entity R can be seen in FIG. 6

The sender software entity E implements versions 1, 3, and 5 of the transaction A. For the transaction A, the version by default is version 5. Version 5 is thus used by default on the first attempt at transmitting this transaction.

The versions table 21 of the receiver software entity R can be seen in FIG. 6

The receiver software entity R implements versions 2, 3, and 4 of the transaction A. For the transaction A, the version by default is version 4.

In FIG. 7, it can be seen that the sender software entity E begins the transaction with an initiator message 22 containing the signature 23 of the version A5, together with the structure description 24 of the version A5.

The receiver software entity R does not find any object having the signature of version A5 concerning the transaction A in its own versions table. The receiver software entity R thus sends an error message 25 to the sender software entity E stipulating that the receiver software entity R can understand the initiator message only with a signature corresponding to version A2, version A3, or version A4.

On receiving the error message 25 concerning the transaction A, the sender software entity E determines the intersection of the two sets of signatures that are possible between the two lists of signatures of the versions of the transaction A that it possesses, i.e. the list in its own versions table and the list in the versions table from the receiver software entity R.

Version 3 is found having the signature A3 that is present in both lists. It can thus be used to carry out the transaction A with the receiver software entity R. The sender software entity E can thus save the information whereby it is the version of the transaction that corresponds to the signature A3 that is to be used for communicating with the receiver software entity R.

Thus, the next attempt of the sender software entity E to communicate with the receiver software entity R can make use directly of the proper version of the transaction.

Figure 8:
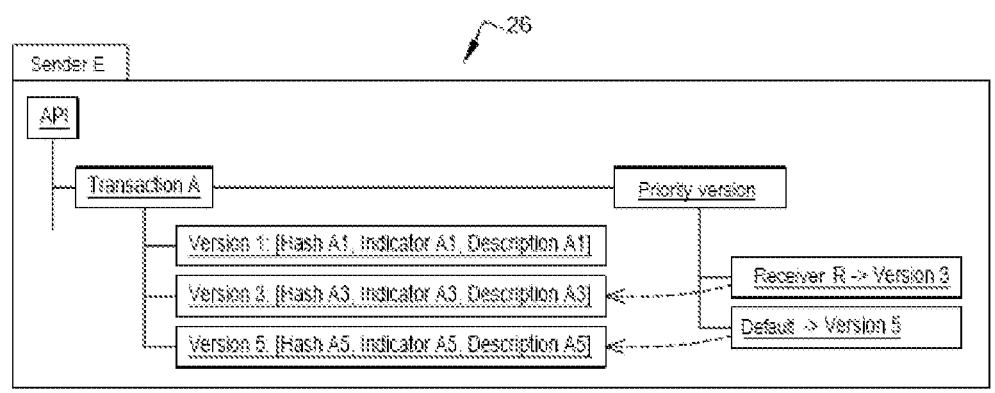
FIG. 8 shows the updated versions table of the receiver software entity.

With reference to FIG. 8, the sender software entity E then updates its versions table 26.

The sender software entity E can thus take account of the fact that initiating a transaction A with the receiver software entity R requires the use of version 3 of the transaction A.

It should be observed that if the intersection of the two lists of signatures includes a plurality of elements, then the sender software entity can select the optimum version of the transaction, i.e. the version that is best adapted to transporting the information it desires to convey (size, parameter subset, etc.). This selection is made using the preference indicator.

Attention is now given more particularly to the situation where a message cannot be processed, since the versions table of the receiver software entity does not contain any object with a signature corresponding to the signature of said message.

It is possible to apply actions depending on the decisions that need to be taken.

It is possible to envisage merely ignoring the message.

The sender software entity will then be unaware that its request has not been processed.

This can give rise to a problem if an answer or a more complex transaction is expected, with the sender software entity then waiting indefinitely.

Nevertheless, if the transaction comprises no more than this single message, ignoring a message that it is not possible to process is an action that is viable.

The receiver software entity can also respond by means of an error message saying that the message cannot be interpreted (as shown in FIG. 7). It is then possible to add information to the error signal that is returned.

By way of example, it is possible to add to the error message merely the reason for the error: the message cannot be processed (e.g. BAD API VERSION).

By way of example, it is also possible to add to the error message one or more signatures corresponding to the versions of the transaction that can be handled: this is shown in FIG. 7.

This or these signatures are to be found in the versions table of the receiver software entity for a transaction having the name of the transaction that was received.

It is also possible to envisage adding optional preference indicators to the error message in correspondence with said signatures so as to enable the sender software entity to select which version to use for a new attempt at transmission.

This can enable the sender software entity to attempt a new transaction with another version of the transaction for which at least one of the signatures received in the error return corresponds to an entry in its own versions table. When a plurality of versions match, it may be advantageous to base selection of the version as a function of the preference indicator that is optionally present in the versions table of the sender software entity and as a function of the preference indicators associated with the signatures of the error return message.

When none of the signatures received in the error return corresponds to an entry in the versions table of the sender software entity, there is complete incompatibility between the versions of the transaction at the sender software end and at the receiver software end for this transaction. The transaction should thus be interrupted.

In a variant of the invention, it is possible to share the versions table during the configuration stage, while connecting together two software entities that seek to communicate via the API. This exchange can thus be a prior stage of synchronization between the two software entities, and each software entity having knowledge of the versions table of the other software entity can make it possible to know in advance which versions of each transaction can be used.

The preference indicator makes it possible to give more details about the logic for selecting the version of the transaction that is to be used depending on usage circumstances.

Insofar as the compatibility information for each transaction of the API is known to all of the software entities that communicate via the API, it is then possible to omit error handling, thereby simplifying the logic that needs to be implemented in order to handle errors.

Specifically, this point provides an advantage insofar as the two software entities in communication are in agreement before any transactions are carried out.

Furthermore, assuming that the version selected for each transaction is unique and predictable, e.g. by means of an algorithm that serves to take the decision to select a single version that is compatible and that satisfies usage needs by relying on the preference indicator of each version of the transaction, it becomes possible to omit sending the signature of the structure description in the message.

Specifically, this information would already be known to each software entity for a given transaction. This thus reduces the amount of data to be transmitted over the medium, and also simplifies management of message decoding since there is no longer any need to search for a matching signature: the signature has been negotiated in advance, so there is no longer any ambiguity.

It should be observed that exchanging the versions table with the information about its use for each of the respective versions (i.e. the signature of the structure description, the preference indicator), is not incompatible with using the signature of the description of a specific version during a transmission. The various different mechanisms can thus be used depending on usage circumstances so as to benefit from their respective advantages for the software entity using the mechanism (simplicity of implementation, coverage of usage circumstances, speed of execution, etc.).

For example, a software entity managing a service may implement the various different mechanisms in order to be able to process all circumstances.

Nevertheless, one particular user of the service may implement transmission of a transaction in only one given version by making use of the signature of the version of the data structure to be exchanged.

In contrast, a service manager can take advantage of prior negotiation of compatibility for transactions of the API that is being used in order to be able to exchange messages more effectively since there is no need to implement error handling for transaction mismatches and there is no need to ensure in advance that the transactions can terminate, or never terminate.

Figure 9:
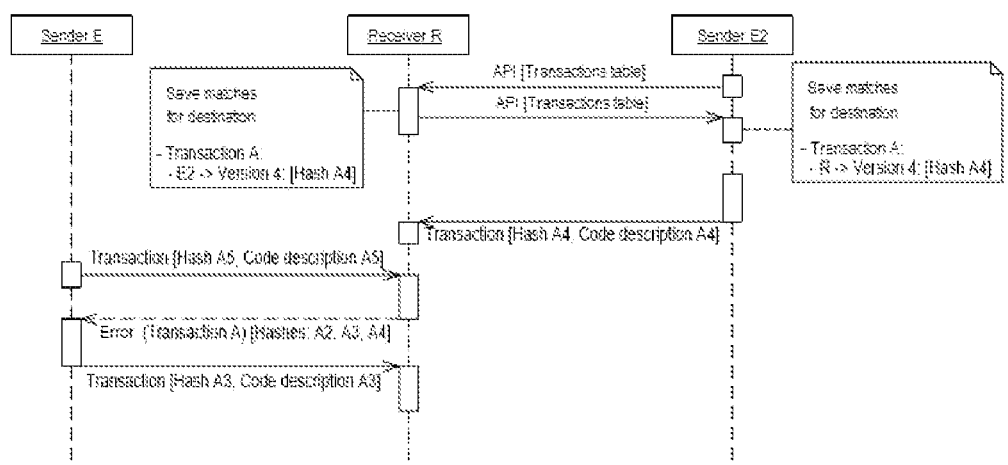
FIG. 9 shows a dialogue between two sender software entities and one receiver software entity.

With reference to FIG. 9, interoperability for two mechanisms for managing transaction versions is determined in the receiver software entity R. The sender software entity E2 co-operates with the receiver software entity R to exchange the transactions table together with the various signatures corresponding to the implemented versions of the transaction A. The result of this exchange enables the sender software entity E2 to select the version 4 corresponding to the signature A4.

Figure 10:
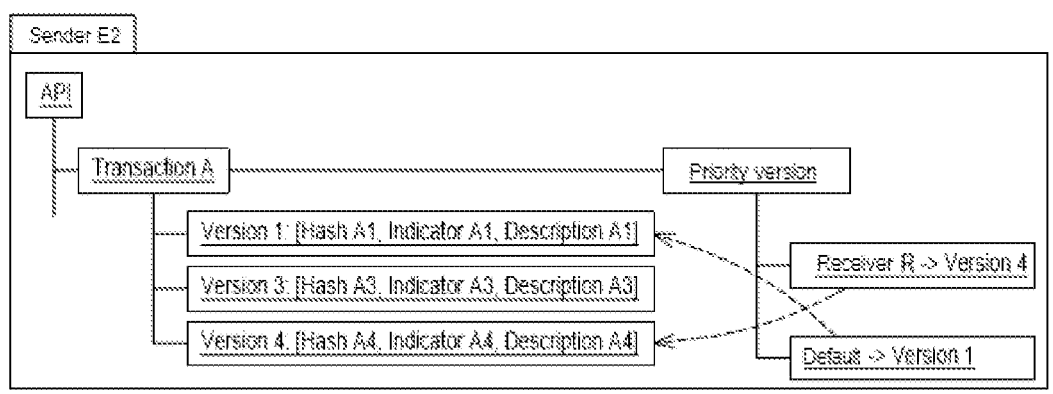
FIG. 10 shows the updated versions table of one of the two sender software entities.

Thereafter, and with reference to FIG. 10, the sender software entity E2 can use version 4 of the transaction A directly to initiate the message exchange, knowing that the receiver software entity R can interpret it.

In parallel, the receiver software entity R can always process individual requests from the sender software entity E. The sender software entity does not synchronize its versions table corresponding to the API, and it attempts to transmit the transaction A with version 5. Error management concerning the use of the wrong version of the transaction nevertheless enables the sender software entity E to retransmit the transaction A with version 3 that is compatible both with the sender software entity E and also with the receiver software entity R.

Naturally, the invention is not limited to the embodiment described, but covers any variant coming within the ambit of the invention as defined by the claims.

The invention claimed is:

1. A communication method for communication between software entities via an application programming interface that comprises at least one transaction, each transaction being defined by a set of messages, the communication method including a configuration stage comprising the following steps that are performed in each software entity and for each version of the transaction that is implemented by said software entity:
   producing a structure description of the version, which structure description includes an global structure for each message that can be exchanged in that version of the transaction;
   producing a signature that is representative of the structure description of the version of the transaction;
   defining and saving an object comprising the signature and the structure description of the version, each object comprising, in addition to the signature and the structure description of the version associated with said object, a preference indicator serving to evaluate a plurality of versions and to compare them with one another in order to select an optimum version for optimizing the performance of the communication;
   the communication method further comprising a sending stage comprising the step of:
   causing a sender software entity to send a current message in a current version of the transaction, together with a current signature of the current version; and a reception stage comprising the steps of:
   causing a receiver software entity to receive the current message and the current signature; and
   causing the receiver software entity to identify an object having the signature identical to the current signature, and to decode the current message by using the structure description of said object.

2. The communication method according to claim 1, wherein, during the configuration stage, the signature is obtained by performing a hashing function on the structure description of the version, which hashing function is identical for all of the versions of the transaction.

3. The communication method according to claim 2, wherein the configuration stage includes a step during which the hashing function is negotiated between the software entities.

4. The communication method according to claim 1, wherein the current signature is transmitted to the receiver software entity by being included in the current message.

5. The communication method according to claim 1, wherein, during the configuration stage, each software entity stores the objects in a versions table.

6. The communication method according to claim 5, wherein, during the configuration stage, the sender software entity and the receiver software entity exchange their respective versions tables so that the sender software entity knows the versions of the transaction that are implemented by the receiver software entity, and uses those versions.

7. The communication method according to claim 5, wherein the versions table of the sender software entity includes, in association with a first receiver software entity, at least one priority identifier that identifies a priority version of the transaction, the sender software entity using the priority version as a priority when communicating with the first receiver software entity.

8. The communication method according to claim 7, wherein the versions table of the sender software entity includes at least one default identifier that identifies a default version of the transaction for use by the sender software entity as a priority when the sender software entity is communicating with a second receiver software entity that is not associated with a priority version in the versions table of the sender software entity.

9. The communication method according to claim 1, wherein the configuration stage includes the step of defining a finite set of basic types for defining the global structures of messages and of associating a type identifier with each basic type, whereby the structure representation of each version comprises a string of said type identifiers.

10. The communication method according to claim 9, wherein each type identifier is a distinct character.

11. The communication method according to claim 10, wherein the global structure of at least one message may also comprise at least one nested data structure.

12. The communication method according to claim 11, wherein the finite set of basic types includes at least one basic type for delimiting the nested data structure.

13. Equipment including a software entity arranged to communicate via an application programming interface that comprises at least one transaction, the software entity including a versions table produced by performing the steps of the configuration stage of the communication method according to claim 1, the software entity also being arranged to perform the sending stage and/or the reception stage of the communication method.

14. A non-transitory computer-readable storage medium storing a computer program including instructions for causing the equipment according to claim 13 to execute the configuration stage and also the sending stage and/or the reception stage of the communication method.

* * * * *